United States Patent
Lee

(10) Patent No.: US 8,654,675 B2
(45) Date of Patent: Feb. 18, 2014

(54) INTERFACE DETECTION DEVICE AND DETECTION METHOD EMPLOYING THE SAME

(75) Inventor: Chun-Chi Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 13/221,847

(22) Filed: Aug. 30, 2011

(65) Prior Publication Data

US 2012/0257537 A1    Oct. 11, 2012

(30) Foreign Application Priority Data

Apr. 6, 2011   (TW) .............................. 100111738 A

(51) Int. Cl.
*H04L 12/28* (2006.01)

(52) U.S. Cl.
USPC ........... 370/254; 370/230; 370/235; 370/428; 709/227; 709/228; 709/229; 713/160; 713/161; 713/168

(58) Field of Classification Search
None
See application file for complete search history.

(56) References Cited

U.S. PATENT DOCUMENTS

| | | | | |
|---|---|---|---|---|
| 5,006,787 A | * | 4/1991 | Katircioglu et al. | 324/73.1 |
| 6,381,218 B1 | * | 4/2002 | McIntyre et al. | 370/245 |
| 6,915,466 B2 | * | 7/2005 | Mastro et al. | 714/712 |
| 8,122,283 B2 | * | 2/2012 | Olson et al. | 714/4.11 |
| 8,149,721 B2 | * | 4/2012 | Ishikawa et al. | 370/241 |
| 2009/0067836 A1 | * | 3/2009 | Liu et al. | 398/50 |

* cited by examiner

*Primary Examiner* — Ian N Moore
*Assistant Examiner* — Latresa McCallum
(74) *Attorney, Agent, or Firm* — Altis Law Group, Inc.

(57) ABSTRACT

An interface detection device in electronic communication with a network tester to receive network packets includes a plurality of local area network (LAN) interfaces, a signal control unit and a path distribution unit. The LAN interfaces are in electronic communication with the network tester and are electrically connected in pairs. The signal control unit provides preset test data for the LAN interfaces and controls the LAN interfaces to generate corresponding verification data. The signal control unit compares the verification data with the test data, and controls the path distribution unit to automatically figure out corresponding transmission paths. The LAN interfaces are electronically communicating with each other through the connected LAN interfaces and the transmission paths to transfer the network packets.

17 Claims, 4 Drawing Sheets

| LAN | A<br>Verification data | B<br>Random test data | C<br>Default test data |
|---|---|---|---|
| 1 | 0b00011110 | 0b01111110 | 0b11111110 |
| 2 | 0b00111110 | 0b10111110 | 0b11111110 |
| 3 | 0b10111110 | 0b00111110 | 0b11111110 |
| 4 | 0b11111110 | 0b11011110 | 0b11111110 |
| 5 | 0b10011110 | 0b01011110 | 0b11111110 |
| 6 | 0b01011110 | 0b10011110 | 0b11111110 |
| 7 | 0b01111110 | 0b00011110 | 0b11111110 |
| 8 | 0b11111110 | 0b11101110 | 0b11111110 |

FIG. 3

INTERFACE DETECTION DEVICE AND DETECTION METHOD EMPLOYING THE SAME

BACKGROUND

1. Technical field

The disclosure generally relates to communications, and more particularly to an interface detection device and a detection method employing the interface detection device.

2. Description of the Related Art

Network devices, such as protocol converters or routers, usually include a number of local area network (LAN) interfaces consisting of hardware and associated circuitry to link different devices. The communication performances of the network devices are generally tested using a network tester.

In the test, the network tester is electrically connected to two LAN interfaces of the network device, for example the router, and the other LAN interfaces are electrically interconnected in pairs to form different transmission paths, the network tester then sends network packets to the network device through the LAN interfaces. However, the connections of the LAN interfaces are inflexible and mechanical and the transmission paths of the network packets are insufficient and simple, resulting in lack of adjustability and efficiency.

Therefore, there is room for improvement within the art.

BRIEF DESCRIPTION OF THE DRAWINGS

Many aspects of an interface detection device and detection method employing the same can be better understood with reference to the following drawings. The components in the drawings are not necessarily drawn to scale, the emphasis instead being placed upon clearly illustrating the principles of the interface detection device and the detection method employing the same. Moreover, in the drawings, like reference numerals designate corresponding parts throughout the several views. Wherever possible, the same reference numbers are used throughout the drawings to refer to the same or like elements of an embodiment.

FIG. 3 is schematic illustration of a data distribution relationship between different data test tables.

DETAILED DESCRIPTION

Figure 1:
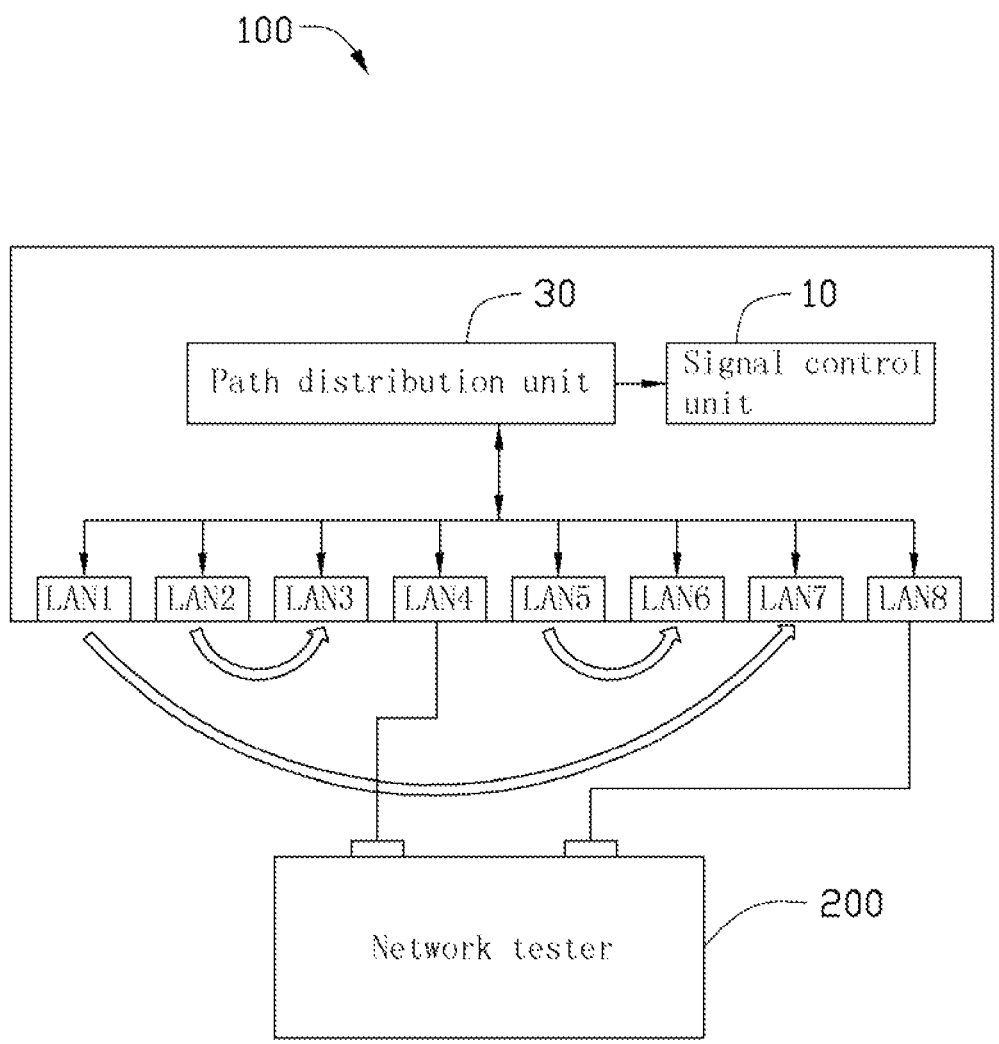
FIG. 1 is a block view of an interface detection device including a plurality of local area network (LAN) interfaces, according to an embodiment of the disclosure.

FIG. 1 shows a block view of an interface detection device 100 including a plurality of local area network (LAN) interfaces, according to an embodiment of the disclosure. The interface detection device 100 is used and integrated within a network equipment such as a protocol converter or a router, and is in electronic connection with a network tester 200 to receive network packets from the network tester 200. In this embodiment the network tester 200 can be SMARTBITS, which can test, simulate, analyze, troubleshoot, develop and certify network infrastructure.

Figure 2:
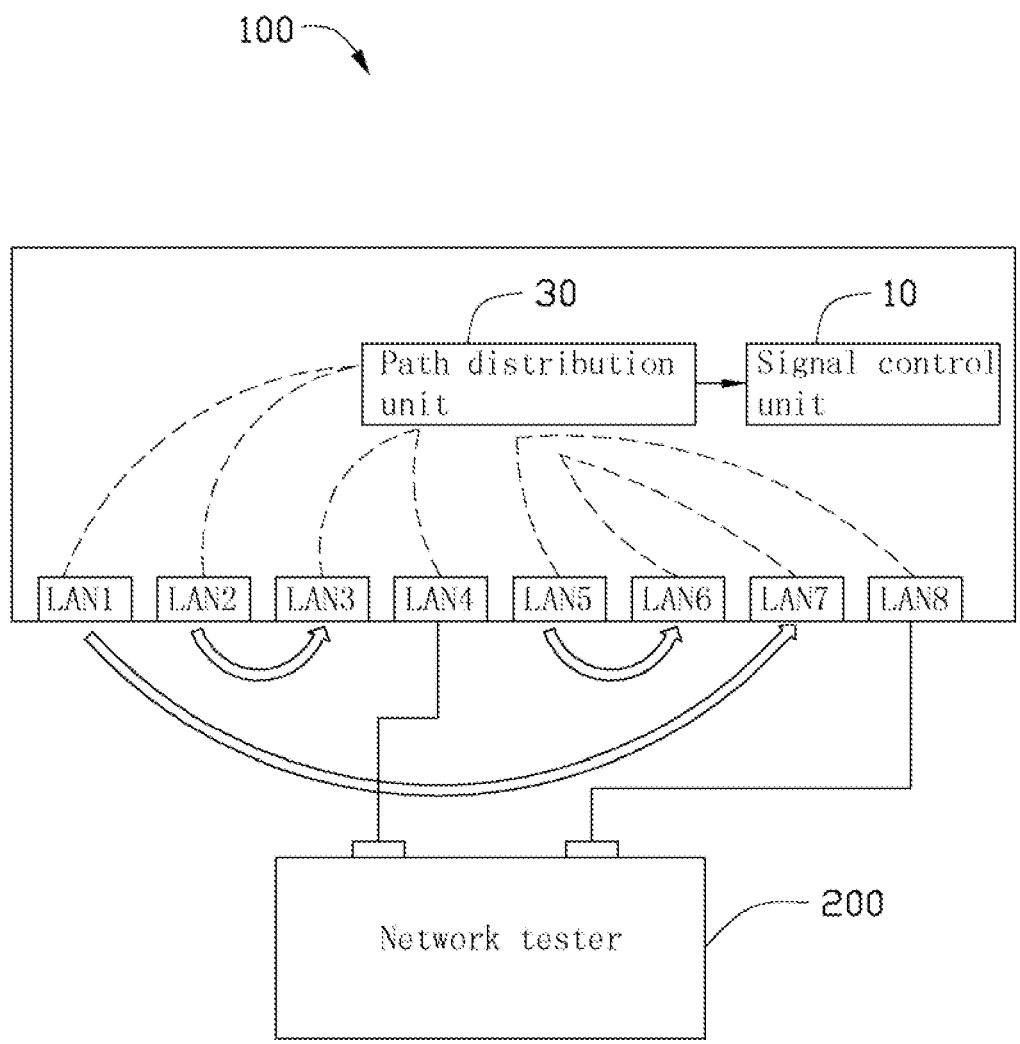
FIG. 2 is a schematic view to illustrate a connection relationship between the LAN interfaces and a network tester shown in FIG. 1.

Referring to FIG. 2, in this embodiment, the interface detection device 100 can automatically detect wiring paths of the LAN interfaces, and further assign corresponding virtual transmission paths of the LAN interfaces to transmit the network packets from the network tester 200. Thus, the network tester 200 sends the network packets to the interface detection device 100 through the wiring paths and the virtual transmission paths to carry out a Snake test for the interface detection device 100. In this embodiment, the Snake test is generally used to automatically detect the virtual transmission paths in a sinuous manner using auto-negotiation and renegotiation techniques, and can also be called continuous test.

The interface detection device 100 further includes a signal control unit 10 and a path distribution unit 30 electrically connected to the signal control unit 10. The path distribution unit 30 is in electronic communication with the LAN interfaces. In this embodiment, the LAN interfaces can be Ethernet LAN interfaces consisting of hardware and associated circuitry that link one device with another (especially a computer and a hard disk drive or other peripherals).

In this embodiment, the LAN interfaces include eight LAN interfaces: LAN1, LAN2, LAN3, LAN4, LAN5, LAN6, LAN7, and LAN8. The network tester 200 is electrically connected to two LAN interfaces, and any two of the other six LAN interfaces are externally and electrically connected in pairs. For example, the network tester 200 is electrically connected to the LAN4 and the LAN8, and sends network packets through the LAN4 and receives test result through the LAN8. The LAN1 is electrically connected to the LAN7, the LAN2 is electrically connected to the LAN3, and the LAN5 is electrically connected to the LAN6.

Referring to FIG. 3, the signal control unit 10 can be a central processing unit (CPU) that carries out each function and instruction of the interface detection device 100 in sequence to perform logical, and input/output operations. The signal control unit 10 assigns and provides two groups of test data that represent link capabilities of the interface detection device 100. The test data is provided for the LAN interfaces. The first group of test data is default test data, which can be preset according to transmission rate of the network packets from the network tester 200. For example, each of the default test data of the LAN1-LAN8 is preset as 0b11111110, where 0b is a flag bit and 11111110 represents binary numbers corresponding to the LAN1-LAN8.

The second group of test data is random test data, and the random test data 0b01111110 is taken here as an example, where 0b is a flag bit. The first binary number 0 corresponds to the LAN1, the second binary number 1 corresponds to the LAN2, and the eighth binary number 0 corresponds to the LAN8. In this embodiment, the random test data is allocated according to the following principles: any two of the random test data of the LAN1-LAN8 are different from each other. The binary numbers corresponding to the LAN1-LAN5 cannot be all 0, and the binary numbers of the LAN1-LAN8 of the random test data is different from those of the LAN1-LAN8 of the corresponding default test numbers. Hence, the total number of the random test data is equal to or less than $(2^5-1)*2^3-1=247$.

The signal control unit 10 is further capable of controlling the LAN interfaces to exchange received random test data between two externally connected LAN interfaces, thereby generating a group of verification data corresponding to the LAN interfaces. The signal control unit 10 then records and compares the verification data with the default test data and the random test data to determine the wiring paths and the transmission paths of the LAN interfaces.

In this embodiment, the path distribution unit 30 can be an integrated electronic switch and distributes and allocates the internal virtual transmission paths for the LAN interfaces according to the external wiring paths. Hence, any two LAN interfaces are in electronic communication with each other through the external wiring paths and the internal transmission paths to transfer the network packets from the network tester 200.

When the path distribution unit 30 detects that the network tester 200 is electrically connected to the LAN4 and LAN8. And the external wiring paths that electrically connect two LAN interfaces in pair are LAN2-LAN3, LAN5-LAN6 and LAN1-LAN7, the signal control unit 10 controls the path distribution unit 30 to distribute and allocate internal virtual transmission paths for the LAN interfaces, which can be LAN1-LAN2, LAN3-LAN4, LAN5-LAN7 and LAN5-LAN8. Thus, the LAN interfaces are electronically communicating with each other, so that the network tester 200 transmits the network packets to such as the LAN4, and receives feedback test result from the LAN8 through the wiring paths and the transmission paths.

Figure 4:
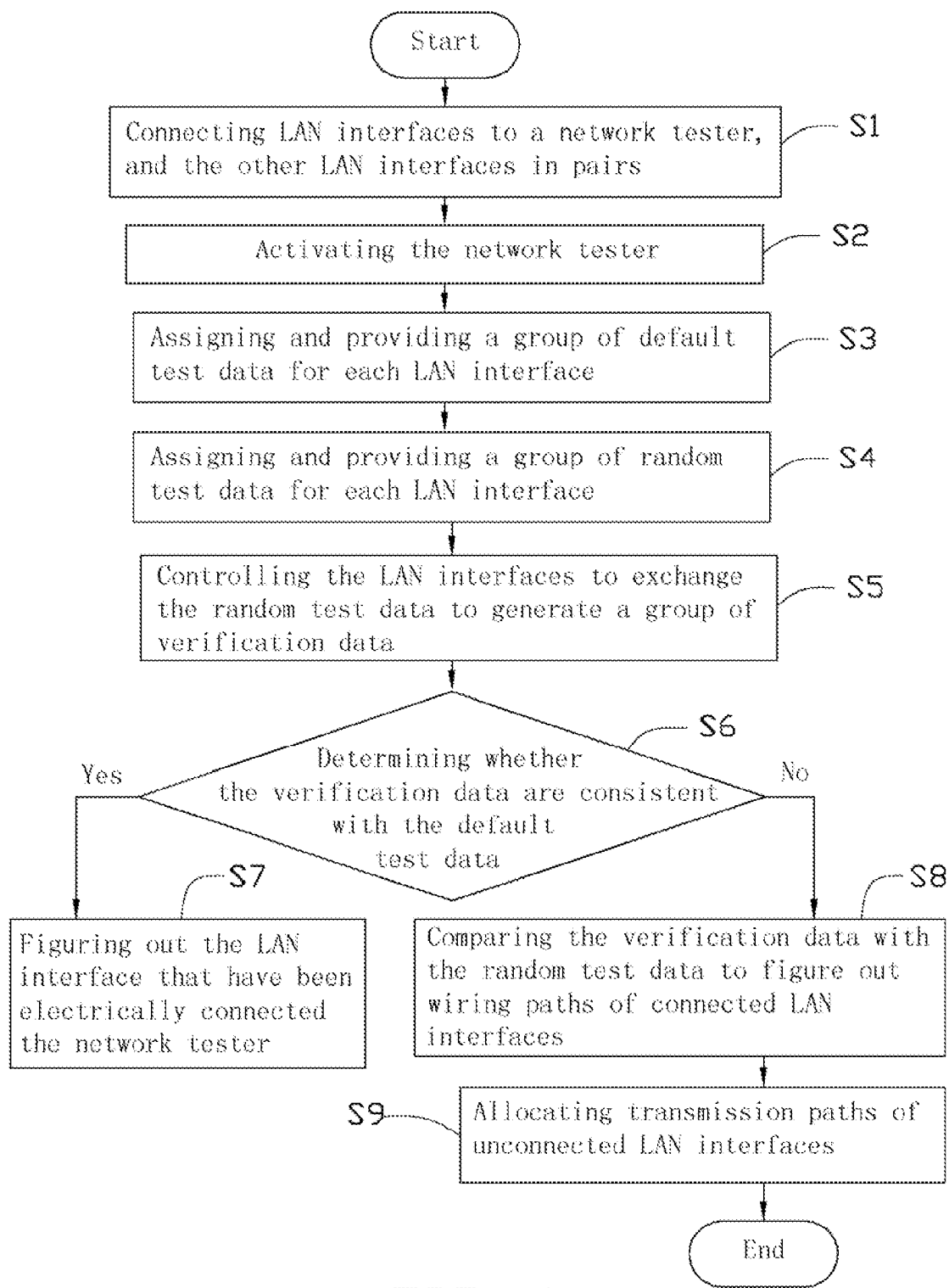
FIG. 4 is a flowchart of a detection method, according to an embodiment of the disclosure.

Referring to FIGS. 3 and 4, a method for detecting the LAN interfaces of the interface detection device 100 according to an embodiment of the disclosure is depicted. The detection method can use the aforementioned interface detection device 100, and may include at least the following steps.

In step S1, the network tester 200 is electrically connected to any two LAN interfaces, and any two of the remaining LAN interfaces are electrically interconnected in pairs. In this embodiment, the network tester 200 is electrically connected to the LAN4 and the LAN8, the LAN1 is electrically connected to the LAN7, the LAN2 is electrically connected to the LAN3, and the LAN5 is electrically connected to the LAN6, thereby, forming three external wiring paths: LAN1-LAN7, LAN2-LAN3 and LAN5-LAN6.

In step S2, the network tester 200 is enabled and activated to prepare a Snake test that can be defined as continuous test to automatically detect the virtual transmission paths in a sinuous manner using auto-negotiation and renegotiation techniques.

In step S3, the signal control unit 10 assigns and provides a group of default test data corresponding to each LAN interface, the default test data is listed in a table C, and each of the default test data of the LAN interfaces is 0b11111110.

In step S4, the control unit 10 randomly assigns and provides a group of random test data corresponding to each LAN interface, and the random test data is listed in a table B. For example, the random test data of the LAN1 is 0b01111110, the random test data of the LAN2 is 0b10111110, the random test data of the LAN3 is 0b00111110, the random test data of the LAN7 is 0b00011110, and the random test data of the LAN8 is 0b11101110.

In step S5, the signal control unit 10 controls the LAN interfaces that are wired connection in pairs to exchange the received random test data with each other to generate a group of verification data, and the verification data is listed in a table A. Since the LAN 4 and the LAN8 are electrically connected to the network tester 200, so that the verification data of the LAN4 and the LAN8 is consistent with the default test data of the LAN4 and the LAN8, which is preset according to the transmission rate of the network packets from the network tester 200. For example, the verification data of the LAN1 is 0b00111110 corresponding to the random test data of the LAN7. The verification data of the LAN3 is 0b10111110 corresponding to the random test data of the LAN2. The verification data of the LAN6 is 0b01011110, which corresponds to the random test data of the LAN5, and the verification data of the LAN8 is 0b11101110, which is consistent with the default test data of the LAN8.

In step S6, the signal control unit 10 records and compares the verification data in the table A with the default test data in the table C. If the verification data in the table A is consistent with the corresponding default test data of the LAN interface in the table C. That is, the preset transmission rate of the network packets from the network tester 200 is substantially equal to that of the corresponding LAN interfaces, the method then proceeds to step S7; if the verification data in the table A is inconsistent with the corresponding default test data in the table C, then the method proceeds to step S8.

In step S7, the signal control unit 10 figures out the corresponding LAN interfaces that have been electrically connected to the network tester 200 according to the comparison of the consistent verification data and the default test data. For instance, the verification data of the LAN4 and the LAN8 in the table A are consistent with the default test data of the LAN4 and the LAN8 in the table C, so the signal control unit 10 determines that the LAN4 and the LAN8 have been electrically connected to the network tester 200.

In step S8, the signal control unit 10 compares the verification data of the LAN interfaces in the table A with the random test data of the LAN interface in the table B to figure out and determine the wiring paths of the paired LAN interfaces. For example, the verification data of the LAN1 in the table A is 0b00011110, and the random test data of the LAN7 in the table B is also 0b00011110 that is consistent with the verification data of the LAN1, so the signal control unit 10 determines the LAN1 is electrically connected to the LAN7, forming a wiring path LAN1-LAN7. Similarly, the signal control unit 10 determines the LAN2 is electrically connected to the LAN3, and the LAN5 is electrically connected to the LAN6.

In step S9, the signal control unit 10 controls the path distribution unit 30 to allocate the internal virtual transmission paths of the unconnected LAN interfaces according to the wiring paths. In this embodiment, the virtual transmission paths include the LAN1-LAN2, the LAN3-LAN4, the LAN5-LAN8, and the LAN6-LAN7. Thus, the LAN interfaces are in electronic communication with each other through the wiring paths and the transmission paths, and the network tester 200 transmits the network packets to the interface detection device 100 to implement and execute the Snake test.

Moreover, any two LAN interfaces can be selectably and electrically connected with each other to form a wiring path according to test requirements. For example, when the LAN5 is disconnected from the LAN6, the signal control unit 10 controls the path distribution unit 30 to redistribute a virtual transmission path LAN7-LAN8 to replace the transmission paths LAN5-LAN8 and LAN6-LAN7.

In summary, in the interface detection device 100 of this disclosure, the signal control unit 10 provides the default data and the random test data for the LAN interfaces, and controls the LAN interfaces to exchange random test data to generate corresponding verification data. The signal control unit 10 compares the verification data with the default test data and the random test data to allocate the virtual transmission paths for the unconnected LAN interfaces. Thus, the LAN interfaces are electronic communicated with each other, so the network tester 200 transmits network packets to one of the LAN interfaces, and receives feedback test result from another LAN interface through the wiring paths and the transmission paths to execute the Snake test. The interface detection device 100 can automatically detect and select transmission paths of the LAN interface before the Snake test, but not limited to the mechanical connection, which can provide different transmission paths of the network packets, and high adjustability and efficiency.

In the present specification and claims, the word "a" or "an" preceding an element does not exclude the presence of a plurality of such elements. Further, the word "comprising" does not exclude the presence of other elements or steps than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. An interface detection device in electronic communication with a network tester to receive network packets, the interface detection device comprising:
   a plurality of local area network (LAN) interfaces, two of the LAN interfaces in electronic communication with the network tester, and other LAN interfaces externally and electrically connected in pairs;
   a signal control unit providing preset test data for the LAN interfaces and controlling the LAN interfaces to generate verification data according to a determination of whether corresponding LAN interfaces are connected together; and
   a path distribution unit electrically connected to the signal control unit, wherein the signal control unit compares the verification data with the test data, and controls the path distribution unit to automatically figure out wired transmission paths between any two of the LAN interfaces and allocate internal virtual transmission paths of unconnected LAN interfaces, and the LAN interfaces are in electronic communication with each other through internal and external transmission paths to transfer the network packets;
   wherein the signal control unit assigns and provides a group of default test data and a group of random test data that represent link capabilities of the interface detection device, the default test data is predetermined according to transmission rate of the network packets, the signal control unit controls the LAN interfaces to exchange the random test data to generate the verification data corresponding to the LAN interfaces; and
   wherein the group of random test data, the group of default test data, and the verification data all include eight binary numbers, and two of the group of random test data are different from each other, top five binary numbers of the random test data cannot be all 0, and the eight binary numbers of the random test data are different from the eight binary numbers of the default test data.

2. The interface detection device as claimed in claim 1, wherein the network tester is electrically connected to two corresponding LAN interfaces, and any two of the other LAN interfaces are electrically interconnected in pairs to form corresponding wiring paths.

3. The interface detection device as claimed in claim 2, wherein the signal control unit controls the path distribution unit to allocate and form corresponding transmission paths between the unconnected LAN interfaces, and the LAN interfaces are in electronic communication with each other through the wiring paths and the transmission paths, the network tester transmits the network packets to the interface detection device to execute and implement a Snake test.

4. The interface detection device as claimed in claim 1, wherein the signal control unit records and compares the verification data with the default test data, if the verification data is consistent with corresponding default test data, the signal control unit figures out the corresponding LAN interfaces that have been electrically connected to the network tester, if the verification data is inconsistent with the corresponding default test data, the signal control unit compares the verification data of the LAN interfaces with the random test data of the LAN interface to figure out and determine the wiring paths of paired LAN interfaces.

5. The interface detection device as claimed in claim 1, wherein the signal control unit controls the path distribution unit to allocate the transmission paths between the unconnected LAN interfaces according to the wiring paths, and the LAN interfaces are in electronic communication with each other through the wiring paths and the transmission paths to transmit the network packets from the network tester.

6. An interface detection device in electronic communication with a network tester, wherein the network tester provides network packets for the interface detection device, the interface detection device comprising:
   a plurality of local area network (LAN) interfaces, wherein two LAN interfaces are in electronic communication with the network tester, and other LAN interfaces are externally and electrically interconnected in pairs to form corresponding wring paths;
   a signal control unit providing a group of default test data and a group of random test data for the LAN interfaces; and
   a path distribution unit electrically connected to the signal control unit, wherein the signal control unit controls the LAN interfaces to create verification data according to the random test data corresponding to the LAN interfaces, the signal control unit compares the verification data with the default test data and the random test data to automatically figure out wiring paths and corresponding wired transmission paths between any two of the LAN interfaces and allocate virtual transmission paths of the unconnected LAN interfaces, and the LAN interfaces are in electronic communication with each other through wired and the virtual transmission paths to transfer the network packets;
   wherein the group of default test data and the group of random test data represent link capabilities of the interface detection device, the default test data is predetermined according to transmission rate of the network packets, the signal control unit controls the LAN interfaces to exchange the random test data to generate the verification data corresponding to the LAN interfaces; and
   wherein the group of random test data, the group of default test data, and the verification data all include eight binary numbers, and two of the group of random test data are different from each other, top five binary numbers of the random test data cannot be all 0, and the eight binary numbers of the random test data are different from the eight binary numbers of the default test data.

7. The interface detection device as claimed in claim 6, wherein the signal control unit controls the path distribution unit to allocate and form corresponding transmission paths between the unconnected LAN interfaces, and the LAN interfaces are electrically communicated with each other through the wiring paths and the transmission paths, the network tester transmits the network packets to the interface detection device to execute and implement a Snake test.

8. The interface detection device as claimed in claim 6, wherein the groups of default test data and random test data represent link capabilities of the interface detection device, the default test data is predetermined according to transmission rate of the network packets, the signal control unit controls the LAN interfaces to exchange the random test data to generate the verification data corresponding to the LAN interfaces.

9. The interface detection device as claimed in claim 8, wherein the signal control unit records and compares the verification data with the default test data, if the verification data is consistent with the corresponding default test data, the signal control unit figures out the corresponding LAN interfaces that have been electrically connected to the network tester.

10. The interface detection device as claimed in claim 9, wherein if the verification data is inconsistent with the corresponding default test data, the signal control unit compares the verification data of the LAN interfaces with the random test data of the LAN interface to figure out and determine the wiring paths of the paired LAN interfaces.

11. A detection method for detecting and allocating wiring paths and transmission paths of a plurality of local area network (LAN) interfaces, the detection method comprising steps of:

connecting two of the LAN interfaces to a network tester and connecting the other LAN interfaces in pairs;

providing test data for the LAN interfaces to generate corresponding verification data according to a determination of whether corresponding LAN interfaces are connected together, wherein the test data comprises a group of default test data and a group of random test data, the group of default test data and the group of random test data that represent link capabilities of the interface detection device, the default test data is predetermined according to transmission rate of network packets;

controlling the LAN interfaces to exchange the random test data to generate the verification data corresponding to the LAN interfaces; and comparing the verification data with the test data to figure out corresponding wiring paths and transmission paths of test data and network packets;

wherein the group of random test data, the group of default test data, and the verification data all include eight binary numbers, and two of the group of random test data are different from each other, top five binary numbers of the random test data cannot be all 0, and the eight binary numbers of the random test data are different from the eight binary numbers of the default test data.

12. The detection method as claimed in claim 11, further comprising assigning and providing the default test data and the random test data for the corresponding LAN interfaces.

13. The detection method as claimed in claim 11, further comprising exchanging the random test data to generate the verification data.

14. The detection method as claimed in claim 11, further comprising comparing the verification data with the default test data and the random test data.

15. The detection method as claimed in claim 14, further comprising figuring out the LAN interfaces that have been electrically connected to the network tester if the default test data is consistent with the verification data.

16. The detection method as claimed in claim 15, further comprising figuring out the wiring paths of the paired LAN interfaces if the verification data is consistent with the random test data.

17. The detection method as claimed in claim 16, further comprising allocating the transmission paths of the unconnected LAN interfaces according to the wiring paths.

* * * * *